United States Patent Office 3,795,686
Patented Mar. 5, 1974

3,795,686
STEROID INSECTICIDE EXTRACTED FROM KALADANA AND PROCESS FOR PRODUCING SAME
Giorgio Ferrari and Luigi Canonica, Milan, and Bruno Danieli, Cesano Maderno, Italy, assignors to Dauten S.A., Roveredo, Switzerland
No Drawing. Filed July 26, 1972, Ser. No. 275,169
Claims priority, application Italy, July 29, 1971, 7,805/71
Int. Cl. C07c 167/40, 169/62
U.S. Cl. 260—397.2
2 Claims

ABSTRACT OF THE DISCLOSURE

Muristerone, namely 2β,3β,5β,11α,14α,20R,22R-eptahydroxy-5β-cholest-7-en-6-one, a new polyhydroxylated steroid, has been extracted from kaladana, namely *Ipomoea calonyction* (Choisy) Hallier f. sp. nova. The invention relates also to the production process and to the powerful insecticidal activity of the muristerone.

---

This invention has as its object a new steroid named muristerone, namely 2β,3β,5β,11α,14α,20R,22R - eptahydroxy-5β-cholest-7-en-6-one, having the formula

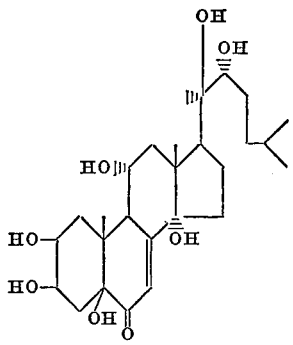

Muristerone belongs to the family of the polyhydroxilated steroids, just as ecdysone, crustecdysone and makisterone A, already known in the past and whose insecticide activity of a biological type has already been tried. The applicants have for some time developed an insecticidal product of wide range, containing as the active agent these three substances, singly and/or in combination, and a process for their production on an industrially-acceptable scale and for the manufacture of the insecticidal product, based on the extraction of these steroids from plants of the family "Convolvulacea" spontaneously growing in the subtropical belt, particularly south Himalayan, known by the native name of "kalandana," on whose classification disagreements existed; in fact in the past they were considered either of the type *Ipomoea calonyction muricatum* G. Don, or of the type *Ipomoea hederacea*. A recent definition classifies the kaladana with the name "*Ipomoea calonyction* (Choisy) Hallier f. sp. nova."

In the course of these researches a new substance has been discovered, indicated by the presence of a green spot of $R_f$ of about 0.23 in the chromatographic examination conducted on a thin layer of silica gel G using as solvent a mixture of methylene chloride-methanol-benzol (25:5:5) and as developer of the spot the reagent vanillin-sulphuric acid, heating to 120° C. for 10 minutes.

Successive researches have succeeded in isolating this new substance, answering to the rough formula $C_{27}H_{44}O_8$, and in identifying its chemical structure therefore the name, as above stated. Muristerone is characterized by the following physical properties: crystallized from ethyl acetate, it has a melting point of 227–30° C.;

$[\alpha]_D^{20} = +49.6 \pm 1°$ (in pyridine)

M+ at m/e 496, M-H₂O at m/e 478.2923 (calculated for $C_{27}H_{42}O_7$: m/e 478.2919); the spectrum of absorption I.R. in KBr presents characteristic peaks at 3600–3100, 1660, 1630 cm.⁻¹; the spectrum of absorption U.V. in methanol shows $\lambda_{max.} = 236$ nm. ($\epsilon = 9050$).

Muristerone, treated with acetone in the presence of a small quantity of an acid catalyst, as for example phosphomolybdic acid, furnishes a mixture of mono- and di-acetonide which are separated by chromatography on columns of silica gel diluting with chloroform-ethanol in the ratio of 99:1 in volume and subsequently in the ratio 98.5:1.5. With 99:1 the di-acetonide is obtained which is acetylated with acetic anhydride in pyridine to give a mono-acetic di-acetonide, melting point 208–214° C. (by the Kofler) after crystallization from hexane.

With the ratio 98.5:1.5 the mono-acetonide is obtained which is acetylated in the same manner as above described, obtaining a mixture of tri-acetate mono-acetonide and di-acetate mono-acetonide. These are separated through chromatography on alumina diluting with chloroform-ethanol in the ratio of 99:1 and subsequently in the ratio 98.5:1.5. In the first case the tri-acetate mono-acetonide is obtained, melting point 255–260° C. (by the Kofler) after crystallization from ethyl-acetate-hexane, and in the second, di-acetate mono-acetonide, melting point 140–144° C. (by the Kofler) after crystallization from hexane.

An important aspect of this invention, particularly from the industrial viewpoint and in view of the use as insecticide, lies in the fact that muristerone, as will be described hereafter, can be produced on an industrial scale without incurring prohibitive costs. As contrasted with this, in the previous techniques concerning the polyhydroxylated steroids, previously mentioned, the principal obstacle to their effective use consisted in the impossibility of producing them in quantity and at commercially acceptable costs.

Another considerable advantage of this invention lies in the fact that muristerone, besides exercising a still more effective insecticidal activity on some insects in comparison with other moly-hydroxylated steroids already mentioned, is much more soluble in water thus greatly facilitating its use.

As already pointed out, this invention is concerned also with the process for the production of muristerone which is characterized by the fact that plants of kaladana, namely *Ipomoea calonyction* (Choisy) Hallier f. sp. nova, are extracted with an appropriate solvent obtaining a crystallized residue, which is subjected subsequently to extraction with distillated water, possibly hot, and to extraction with methanol performed on the insoluble residue of the preceding extraction, obtaining after evaporation to dryness of the aqueous solutions coming from the various crystallizations, a new fraction, from which through separation by chromatography muristerone is isolated.

By way of confirmation, it is found that muristerone, treated with acetic anhydride in pyridine, forms an acetyl derivative which, crystallized from ethyl acetate-hexane (1:1), has a melting point (corrected) of 236–238° C.

The example which follows will illustrate more clearly the process of this invention, it being understood that the example is not to be considered as an undue limitation.

EXAMPLE 120 grams of total crystallizate (T), as obtained through extraction of ground and defatted seeds of kaladana with a mixture of chloroform-methanol-ammonia (9:0, 9:0.1), as described in a copending patent application of the same applicants, Ser. No. 217,842, filed Jan. 14, 1972, are suspended in 1000 mls. of distilled water. The suspension is stirred during one hour at a temperature of 25° C. At the end of this time, it is filtered by pump. The filtrate is set aside and the filter cake is subjected again to new, subsequent treatments with water, under the same conditions as reported above. The quantities of water, which are used for the subsequent treatments, are always 1000 mls. each time.

After the fourth treatment, the thin layer chromatographic examination, carried out with the technique previously described, shows that the yellow spot of crustecdysone in the cake (40 grams) as resulting from the washings with the water, is definitely weaker than the violet spot of makisterone A and then the blue one of ecdysone.

To the combined aqueous filtrates (4000 mls.) 1600 mls. of methanol are added, thus serving for subsequent treatments for the separation of crustecdysone.

The water insoluble portion (A) of the total crystallizate as such, that is still water humid, is taken up in pure methanol on a water bath at 50° C. Subsequently, the mass is cooled to room temperature. The product thus separated (B) is filtered. The methanolic filtrate, from which (B) has been separated, shows at the chromatographic examination as above, that it contains crustecdysone and ecdysone and is sent to the ecdysone recovery step.

The insoluble residue (B), about 15 grams, is firstly crystallized from methanol (50 mls.) and, subsequently, from methanol containing 1% by volume of water, until a chromatographically acceptable purity is obtained. The product thus obtained is makisterone A.

The mother-waters coming from all the various crystallizations are combined and evaporated to dryness, in vacuo, at a temperature lower than 35° C. obtaining a residue (D).

The residue (D) (21 grams) mixed with 50 grams of silica gel (particle size of 0.05–0.2 mm.) is charged into a column prepared with 600 grams of the same silica gel. Elution is firstly carried out with chloroform-methanol 95:5. The dry residue of these eluates is discarded. The four subsequent elutions with chloroform-methanol 90:10 (1 lt.) give a residue which, examined by thin layer chromatography, shows the presence of the new substance with green spot. This residue is again subjected to chromatography on a new column as above, until absolute purity is obtained by only eluting with chloroform-methanol 95:5. The new eluates, evaporated to dryness, give a residue which when re-crystallized from ethyl acetate gives a product having a melting point of 227–230° C.

I.R. in KBr cm.$^{-1}$ 3600–3200; 1660, 1630.

U.V. in methanol 236 nm. ($\epsilon$=9050)

300 milligrams of muristerone, dissolved in 4 mls. of anhydrous pyridine supplemented by 2 mls. of acetic anhydride, are allowed to stand for 24 hours at room temperature. The reaction mass is poured into an excess of water. The separated product is dried and purified by chromatography on a silica gel column (particle size of 0.05–0.2 mm.) by eluting with chloroform-methanol 98:2. The residue, as obtained by evaporating the eluates and re-crystallizing from ethyl acetate-hexane 1:1, shows a melting point (corrected) of 236–238° C.

I.R. in KBr 3600—3300; 1740, 1720, 1680, 1630, 1250 cm.$^{-1}$.

As pointed out previously, the new substance which is the object of this invention has revealed itself to possess a powerful insecticidal action, which can probably be explained by the fact that it belongs to the class of the poly-hydroxylated steroids already mentioned, which in turn are also known to be the hormones that regulate the metamorphosis of the insects. In effect, it has been found that the insecticidal action of muristerone is manifested when one administers to the insects a quantity of at least $10^{-6}$ g. of active substance per gram of body weight of the insect. It is obvious that the administration can be made either in soluble form or in liquid suspension form of the muristerone, facilitated as a matter of fact by its greater solubility, either in pulverized solid form in conjunction with excipients and fillers of appropriate type, or even with other insecticides, in order to obtain a more complete or synergic action.

The following Table I shows the results of trials conducted with muristerone on Bombyx mori IV, larval stage, making a single administration on a disk of mulberry leaf having a surface area of 7 cm.$^2$, the muristerone being dissolved in acetone. The data reported in the Table I give the average of fifteen repetitions.

Table II reports the results of the comparison trials, carried out under the same conditions with makisterone A, the insecticidal properties of which were already known in the past. From the comparison of these data, the greater effectiveness of muristerone is self-evident.

TABLE I

| Quantities of active substance (muristerone) in subject of 2 grams weight | 2.5 | 5 | 10 | 20 | 40 | 80 | 160 | 320 | Acetone | Control |
|---|---|---|---|---|---|---|---|---|---|---|
| Larval mortality, percent: | | | | | | | | | | |
| Short term (1–2 days) | | | | 94 | 100 | 100 | 100 | 100 | 100 | |
| Long term (3–10 days) | | 88 | 94 | | | | | | | |
| Larval mortality, percent, at beginning of spinning of cocoon | | | | | | | | | | |
| Larval mortality, percent of cocoon | | 6 | 6 | 6 | | | | | | |
| Total mortality, percent | | 94 | 100 | 100 | 100 | 100 | 100 | 100 | 100 | |
| Emergences from cocoon | | 6 | | | | | | | 100 | 100 |
| Laying of eggs | | Yes | | | | | | | Yes | Yes |

TABLE II

| Quantities of active substance (makisterone A) in subject of 2 grams weight | 2.5 | 5 | 10 | 20 | 40 | 80 | 160 | 320 | Acetone | Control |
|---|---|---|---|---|---|---|---|---|---|---|
| Larval mortality, percent: | | | | | | | | | | |
| Short term (1–2 days) | | | | | | | 80 | | | |
| Long term (3–10 days) | 60 | 27 | 40 | | 20 | 34 | 20 | | | |
| Larval mortality, percent, at beginning of spinning of cocoon | | | | 6 | 6 | 6 | 20 | | | |
| Larval mortality, percent of cocoon | 34 | 12 | 34 | 60 | 54 | 47 | 60 | 20 | | |
| Total mortality, percent | 94 | 39 | 74 | 66 | 80 | 87 | 100 | 100 | | |
| Emergences from cocoon | 6 | 61 | 26 | 34 | 20 | 13 | | | 100 | 100 |
| Laying of eggs | Yes | Yes | Yes | Yes | Yes | Yes | | | Yes | Yes |

What we claim is:

1. Muristerone, namely 2β,3β,5β,11α,14α,20R,22R-eptahydroxy - 5β - cholest-7-en-6-one, having the formula:

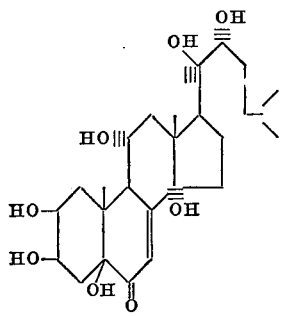

having as the physical characteristic properties: (1) melting point of 227–230° C., (2) characteristic peaks of the infra-red absorption spectrum in KBr at wave lengths of 3600–3200, 1660, 1630 cm.$^{-1}$, and (3) $\lambda_{max.}$=236 nm. ($\epsilon$=9050) in the ultra-violet absorption spectrum in methanol.

2. Process for the production of the steroid according to claim 1, wherein ground and defatted seeds of kaladana, namely *Ipomoea calonyction* (Choisy) Hallier f. sp. nova, are extracted with a mixture of chloroform-methanol and ammonia, to obtain a crystallized residue, subjecting said residue to a plurality of extractions with distilled water, subjecting the insoluble crystallized residue to extraction with methanol, combining and evaporating in vacuo to dryness the aqueous solutions coming from the various crystallizations, to obtain a new fraction from which, through separation by chromatography, the steroid is isolated.

No references cited.

HENRY A. FRENCH, Primary Examiner

U.S. Cl. X.R.

260—899